US009285862B2

(12) United States Patent
Zhong (10) Patent No.: US 9,285,862 B2
(45) Date of Patent: Mar. 15, 2016

(54) MOBILE TERMINAL AND POWER-SAVING METHOD AND DEVICE FOR SAME

(75) Inventor: Yong Zhong, Beijing (CN)

(73) Assignee: ST-ERICSSON SEMICONDUCTOR (BEIJING) CO., LTD, Beijing (CN)

(*) Notice: Subject to any disclaimer, the term of this patent is extended or adjusted under 35 U.S.C. 154(b) by 278 days.

(21) Appl. No.: 13/879,912

(22) PCT Filed: Oct. 21, 2011

(86) PCT No.: PCT/CN2011/081109
§ 371 (c)(1),
(2), (4) Date: May 21, 2013

(87) PCT Pub. No.: WO2012/051965
PCT Pub. Date: Apr. 26, 2012

(65) Prior Publication Data
US 2013/0238917 A1    Sep. 12, 2013

(30) Foreign Application Priority Data

Oct. 21, 2010  (CN) .......................... 2010 1 0520799

(51) Int. Cl.
*H04W 52/02* (2009.01)
*G06F 1/32* (2006.01)
(52) U.S. Cl.
CPC ......... *G06F 1/3234* (2013.01); *H04W 52/0225* (2013.01); *H04W 52/0261* (2013.01); *Y02B 60/50* (2013.01)
(58) Field of Classification Search
CPC ............... H04W 52/0225; H04W 52/0261; H04W 76/046
See application file for complete search history.

(56) References Cited

U.S. PATENT DOCUMENTS

| 2011/0151944 A1* | 6/2011 | Morgan | H04W 52/0258 455/574 |
| 2011/0319064 A1* | 12/2011 | Lenart | H04W 52/0225 455/418 |
| 2012/0033594 A1* | 2/2012 | Kalbag | 370/311 |

FOREIGN PATENT DOCUMENTS

| CN | 1897725 A | 1/2007 |
| CN | 101043714 A | 9/2007 |
| CN | 101986679 A | 3/2011 |
| WO | 2010/005209 A2 | 1/2010 |

OTHER PUBLICATIONS

International Search Report issued in corresponding International application No. PCT/CN2011/081109, mailing date Feb. 2, 2012.

* cited by examiner

*Primary Examiner* — Albert Wang
(74) *Attorney, Agent, or Firm* — Patent Portfolio Builders PLLC (57) ABSTRACT

The present invention provides a power-saving method for a mobile terminal, comprising the steps, after setting the mobile terminal to be in a data service power-saving state, monitoring, by the mobile terminal, a data service in accordance with a monitoring strategy for the data service power-saving state, and triggering a data service power-saving operation when a triggering condition set in the monitoring strategy is met. The present invention further provides a power-saving apparatus arranged within a mobile terminal, comprising a monitoring unit and an executing unit, wherein the monitoring unit is configured to monitor data services of the mobile terminal in accordance with a preset monitoring strategy, and send a power-saving command to the executing unit when a data service power-saving strategy is met. The present invention further provides a mobile terminal comprising the power-saving apparatus. As a result, the mobile can rapidly enter the data service power-saving mode according to the monitoring strategy, reduce unnecessary power consumption, and prolong the service time for the mobile terminal.

15 Claims, 7 Drawing Sheets

MOBILE TERMINAL AND POWER-SAVING METHOD AND DEVICE FOR SAME

TECHNICAL FIELD

The present invention relates to a field of mobile communication, in particular to a mobile terminal in a data service state, a power-saving method and a power-saving apparatus.

BACKGROUND

Along with the coming of the 3G age and the rapid development of mobile Internet, a mobile terminal is not merely used for ordinary circuit switching services such as phone and short message any more. Various data services, particularly background class data services with a small data volume, appear as required. These data services which used to be completed by a desktop computer, for example, surfing the Internet, searching, chatting, electronic business, e-mail, online games, streaming media and so on, can now be processed by a mobile terminal. The mobile terminals such as smart phone, netbook and handheld PC facilitate people's work and life.

These mobile terminals are more often used for data services. However, the resultant power consumption exceeds that desired for the traditional circuit switching services such as phone and short message, and becomes a main part of the power consumption for the mobile terminals. There exists a higher demand on power-saving of the mobile terminals due to explosive growth of the data services. In order to prolong the service time for the mobile terminals, various methods must be adopted to reduce the power consumption.

In the prior art, some solutions are provided to reduce the power consumption of the mobile terminals. Their main idea is to turn on the modules inside the mobile terminal to be in a power-saving mode as possible on the premise that the normal operation of the mobile terminal is not affected. For example, the ambient luminous intensity may be detected, and the backlight intensity of the mobile terminal may be reduced when the ambient luminous intensity is strong, or a display screen, a screen backlight and a keyboard light may be turned off if no operation is made by a user within a period of time. When there is no service operated on the mobile terminal, a chip of the mobile terminal begins to sleep after a period of time and enters the power-saving mode.

However, when the mobile terminal starts a data service, particularly a background class data service with a small data volume, there will always exists a connection between the mobile terminal and an access network or a core network if the user does not voluntarily terminate the data service, even without any data transmission for the data service. At this time, the chip of the mobile terminal will always be in an operation state, which will lead to the waste of power and wireless resources. In fact, most of the time users do not know what data services have been started, so they do not know where to start even if they want to terminate the data services for power saving.

SUMMARY

The present invention provides a method and an apparatus for saving power for a mobile terminal, so as to solve the problem existing in the prior art, i.e., how to save power in a data service state.

In order to solve the above-mentioned problem, the present invention provides a power-saving method for a mobile terminal, comprising the steps of:

setting the mobile terminal to be in a data service power-saving state;

monitoring, by the mobile terminal, data services in accordance with a monitoring strategy for the data service power-saving state;

triggering a data service power-saving operation when a triggering condition set in the monitoring strategy is met; and performing, by the mobile terminal, the data service power-saving operation.

The present invention further provides a power-saving apparatus, arranged within a mobile terminal, the power-saving apparatus comprising a monitoring unit and an executing unit, wherein:

the monitoring unit is configured to monitor data services of the mobile terminal in accordance with a preset monitoring strategy, and send a power-saving command to the executing unit when a data service power-saving strategy is met; and the executing unit is configured to, after receiving the power-saving command from the monitoring unit, execute a power-saving operation so as to turn on the mobile terminal to enter a data service power-saving mode.

The power-saving apparatus may further comprise a setting unit connected to the monitoring unit and configured to process settings of a user for a data service power-saving function, store the settings, send a command to turn on or turn off the data service power-saving function to the monitoring unit, and store setting parameters in the case that the data service power-saving function is turned on.

The present invention further provides a mobile terminal including the above-mentioned power-saving apparatus.

According to the present invention, it is able to automatically monitor the data service state of the mobile terminal in accordance with a preset monitoring strategy on the premise that the normal operation of the mobile terminal is not affected, rapidly enter the data service power-saving mode, reduce unnecessary power consumption, prolong the service time for the mobile terminal, and release unnecessary air-interface resources. In addition, when the user re-activates the data service, it is able to rapidly recover the data service without affecting the normal use.

DETAILED DESCRIPTION

The present invention is described in details hereinafter in conjunction with the drawings.

Figure 1:
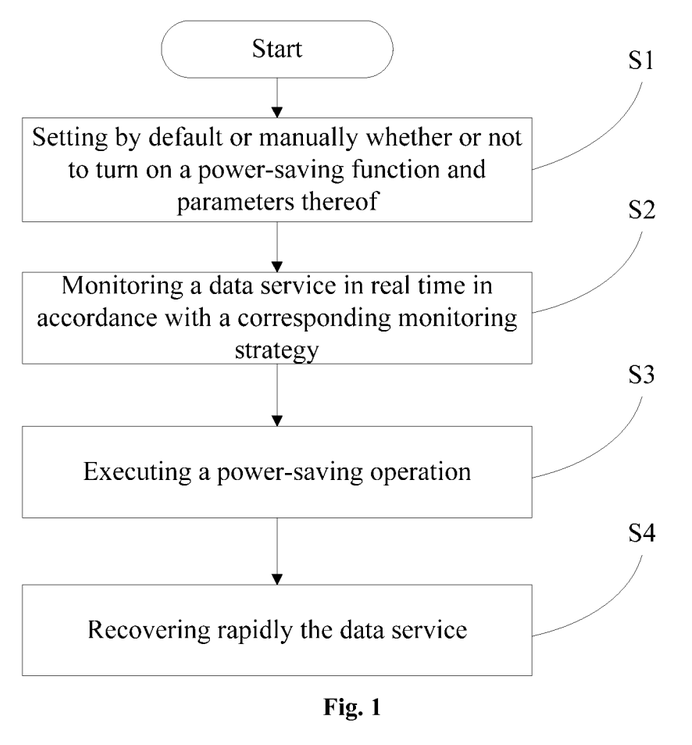
FIG. 1 is a flow chart showing a power-saving method according to embodiments of the present invention.

As shown in FIG. 1, the present invention provides a power-saving method, mainly comprising: step S1, setting by default or manually on a mobile terminal whether or not to turn on a data service power-saving function and parameters thereof; step S2, performing, by the mobile terminal, real-time monitoring on a data service in accordance with a corresponding monitoring strategy, and determining whether or not to trigger a power-saving operation; step S3, performing the corresponding power-saving operation; and step S4, recovering rapidly the data service.

Figure 2:
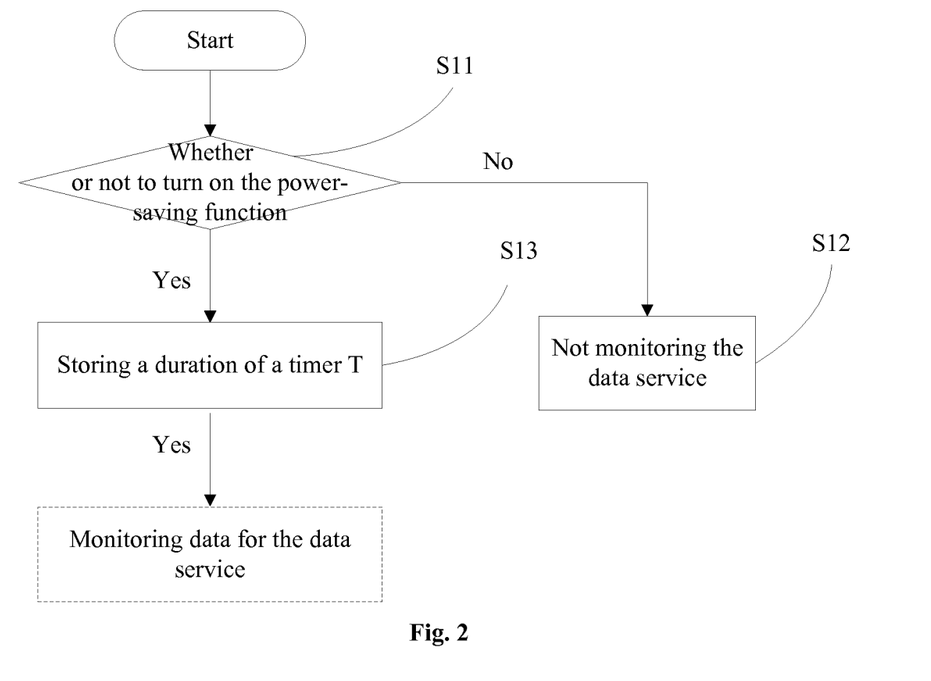
FIG. 2 is a flow chart showing the setting of data service power-saving function according to embodiments of the present invention.

Preferably, in step S1, the data service power-saving function of the mobile terminal is turned on automatically by default, and a user may change the setting manually if desired. The specific procedure for the power-saving setting is shown in FIG. 2, which comprises the following steps:

step S11: setting, by the user, whether or not to turn on the data service power-saving function and the parameters via software commands;

step S12: if the user selects to turn off the data service power-saving function, the mobile terminal will not monitor the data service, or exit from a power-saving mode; and step S13: if the user selects to turn on the data service power-saving function, the mobile terminal stores the corresponding parameter. To be specific, the parameter may be a duration of a timer T, i.e., a period during no data transmission for the data service. Such a duration cannot be set as too short to facilitate the user experience of some applications. In the meanwhile, in order to save power in time, such a duration cannot be set as too long. Preferably, in order to improve the user experience, the user may be prompted to set the duration of the timer T as between 5 and 20 minutes. The period input by the user may be stored finally. Alternatively, a recommended duration of the timer T may be preset in the mobile terminal, and after turning on the data service power-saving function, the user may directly use such a preset duration.

Figure 3:
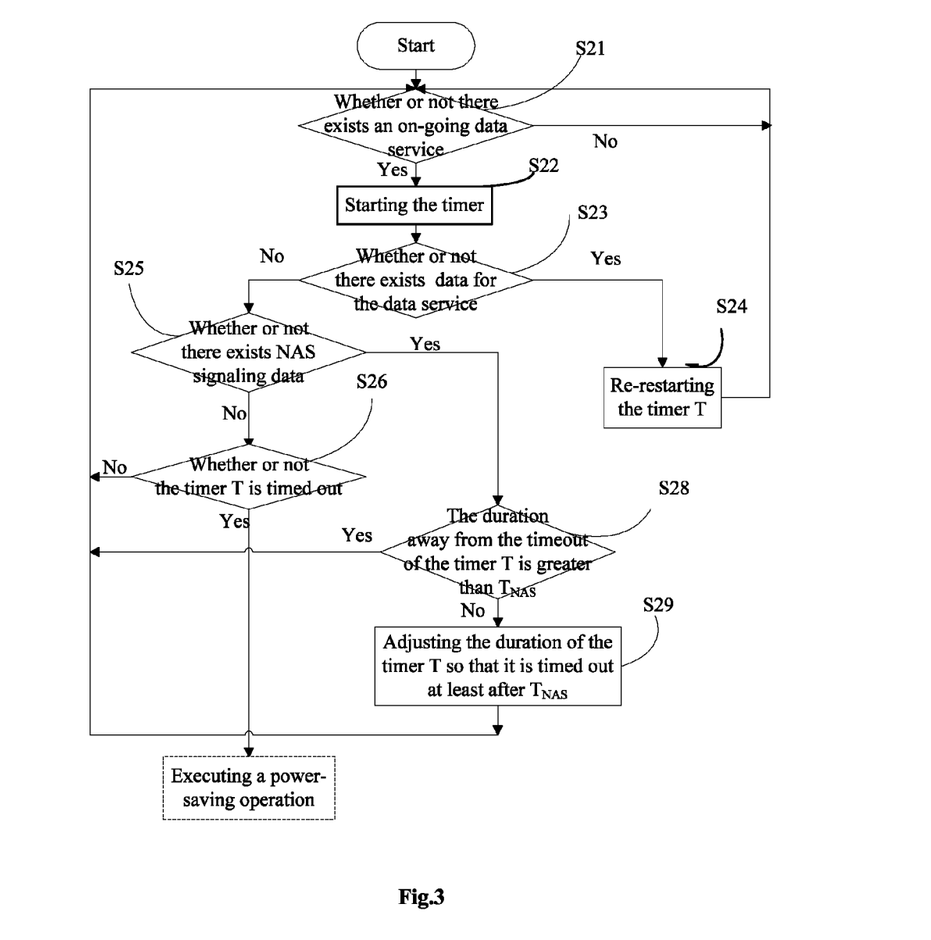
FIG. 3 is a flow chart showing a monitoring strategy according to one embodiment of the present invention.

After setting the data service power-saving mode, the mobile terminal will monitor the data service in accordance with the preset monitoring strategy. Once no data transmission for the data service is monitored within a period of time, the power-saving operation will be triggered, as shown in FIG. 3, which comprises the following steps.

Step S21: judging whether or not there exists an on-going data service on the mobile terminal.

To be specific, all the radio bearers may be scanned to judge whether there exist radio bearers for the data service. If there is no on-going data service, the procedure returns to step S21 to continue the scanning, and if there exists an on-going data service, the procedure enters step S22 to start the timer T and then enters step S23.

Step 23: judging whether or not there exists data transmission for the data service.

To be specific, whether or not valid data (uplink or downlink) for the data service is being transmitted on a data plane of the mobile terminal may be monitored in real time. If yes, the procedure enters step S24 to restart the timer T and then returns to step S21; if not, the procedure enters step S25.

In order to prevent conflict between the subsequent power-saving operation and NAS signaling, when the mobile terminal monitors the data service, a complete NAS signaling procedure may be ensured first. The NAS signaling refers to the signaling interaction non-access stratum (NAS) information between the mobile terminal and a core network, e.g., authentication, service request, and connection establishment. In order to ensure that there is sufficient time to process the on-going NAS signaling procedure before the timeout of the timer T, the monitoring strategy comprises the following steps.

Step S25: judging whether there exists NAS signaling transmission.

To be specific, whether or not there exists NAS signaling (uplink or downlink) transmission on a control plane of the mobile terminal may be monitored in real time. If there is no NAS signaling transmission, the procedure enters step S26 to judge whether the timer T is timed out. If the timer is not timed out, the procedure returns to step S23 to continue to monitor the data for the data service in real time. If the timer T is timed out, i.e., there exists no data transmission for the data service within this period of time, or no conflict with the NAS signaling, the mobile terminal is triggered to perform the power-saving operation. If there is NAS signaling as judged in step S25, the procedure enters step S28.

Step 28: judging whether the duration away from the timeout of the timer T is greater than a maximum timer duration $T_{NAS}$ for an NAS layer. The maximum timer duration $T_{NAS}$ for the NAS layer is a maximum one of the allowable durations for processing the NAS signaling and it may be determined in accordance with all the timers of an NAS layer protocol, usually as 30 s. When the duration away from the timeout of the timer T is greater than the maximum timer duration $T_{NAS}$ for the NAS layer, the NAS signaling procedure can be completed before the timeout of the timer T, and the desired power-saving operation will not affect the NAS signaling procedure. So, the procedure returns to step S23 to continue to monitor the data for the data service in real time, and the timers T continues to work. When the duration away from the timeout of the timer T is less than the maximum timer duration $T_{NAS}$ for the NAS layer, the NAS signaling procedure may be interrupted by the power-saving operation before the timeout of the timer T. In order to ensure the completion of the NAS signaling procedure, it needs to execute step S29.

Step 29: adjusting the duration of the timer T so that it is timed out at least after $T_{NAS}$.

To be specific, the duration of the timer T may be directly prolonged by $T_{NAS}$ so that the duration away from the timeout of the timer T may probably be greater than $T_{NAS}$ if there still exists NAS signaling data for a next step S25 and it is unnecessary to take step S29. After the NAS signaling transmission is completed, the timer T continues to work in step S26 until it is timed out, i.e., the power-saving operation is executed.

When the power-saving operation is executed, the chip of the mobile terminal is switched to a sleep state and enters the power-saving mode, so as to avoid meaningless power consumption and meaningless waste of radio resources when there is data service but no data for the data service. For example, if the user forgets to close a website after opening it for reading, downloading songs, uploading data or sending e-mails, the chip will always be in a working state, which thereby leads to meaningless power consumption and meaningless waste of radio resources.

Another alternative mode is to ensure that there does not exist a too big difference between an actual duration when the timer T is timed out and the preset duration on the premise of not affecting the NAS signaling procedure. Here, the duration away from the timeout of the timer T is prolonged to $T_{NAS}$ so that, when a next step S25 is executed, the time to wait for the timeout of the timer T in step S26 is shorter than that in the above-mentioned mode if the NAS signaling transmission has been completed. As a result, it is able to ensure that the NAS signaling procedure can be completed successfully and the actual duration when the timer T is timed out does not increase excessively due to the NAS signaling.

The adjusted duration of the timer T may be reset after the timer T is timed out, that is, the value of the timer T may be reset before the timer T is started when it is monitored that there exists data services again after the power-saving operation. For example, if a software timer is used, its duration is set as a default value each time it is started.

Figure 4:
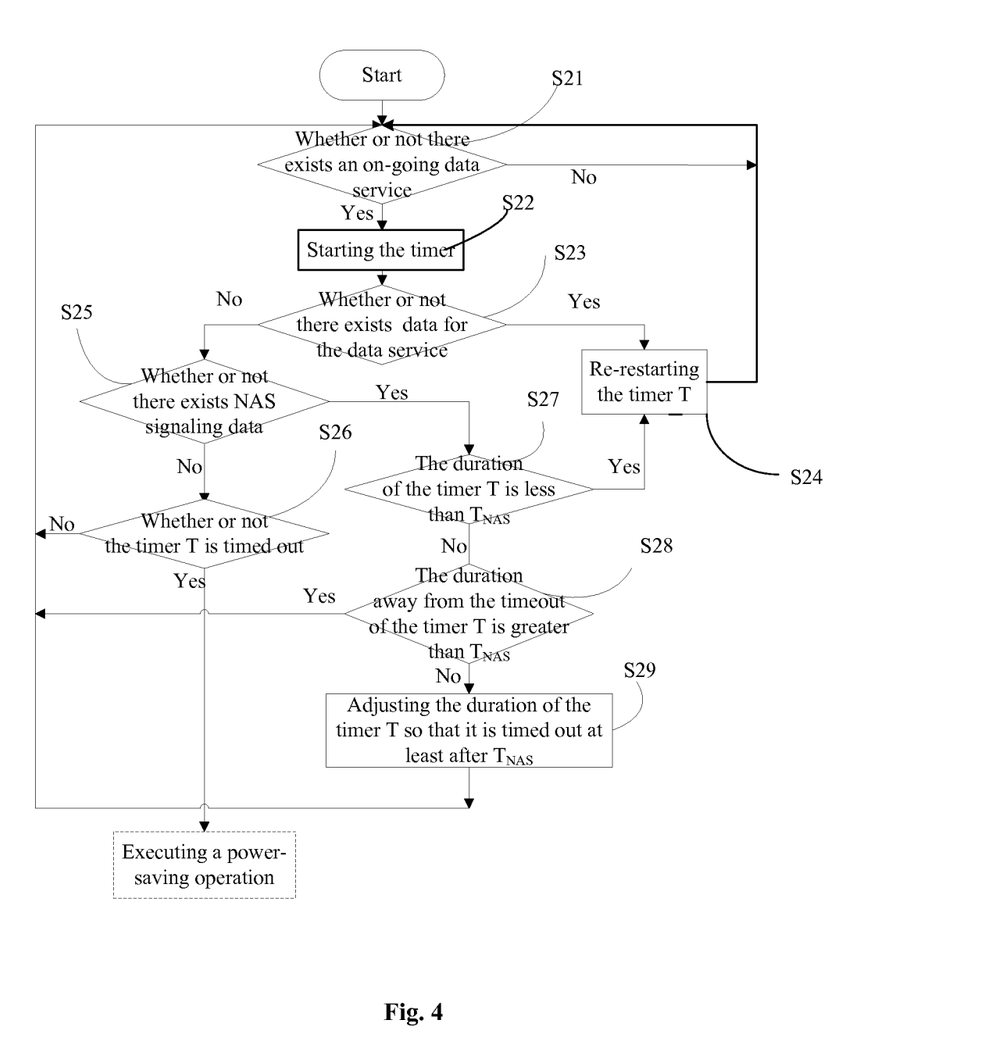
FIG. 4 is a flow chart showing a monitoring strategy according to another embodiment of the present invention.

In another alternative mode, as shown in FIG. 4, step S27 is added prior to step S28, i.e., directly judging whether the duration of the timer T is less than the maximum timer duration $T_{NAS}$ of the NAS layer if it is judged in step S25 that there is the NAS signaling.

To be specific, just as described in step S13, the duration of the timer T may not be set as too short, and usually it is greater than $T_{NAS}$. Normally, the NAS signaling procedure can be completed within this period of time. However, the duration of the timer T set by the user is less than $T_{NAS}$, subsequent to step S27, the timer T will be restarted in step S24, and then the procedure returns to step S21. If the duration of the timer T is greater than $T_{NAS}$, the procedure proceeds to step S28.

Step S27 is added so as to rapidly restart the timer T when it is judged that the duration of the timer T is less than $T_{NAS}$, without step S28 in which the remaining duration away from the timeout of the timer T is calculated and compared with $T_{NAS}$. In addition, it is unnecessary to adjust the duration of the timer T in accordance with $T_{NAS}$ as mentioned in step S29, and to reset the timer T.

Figure 5:
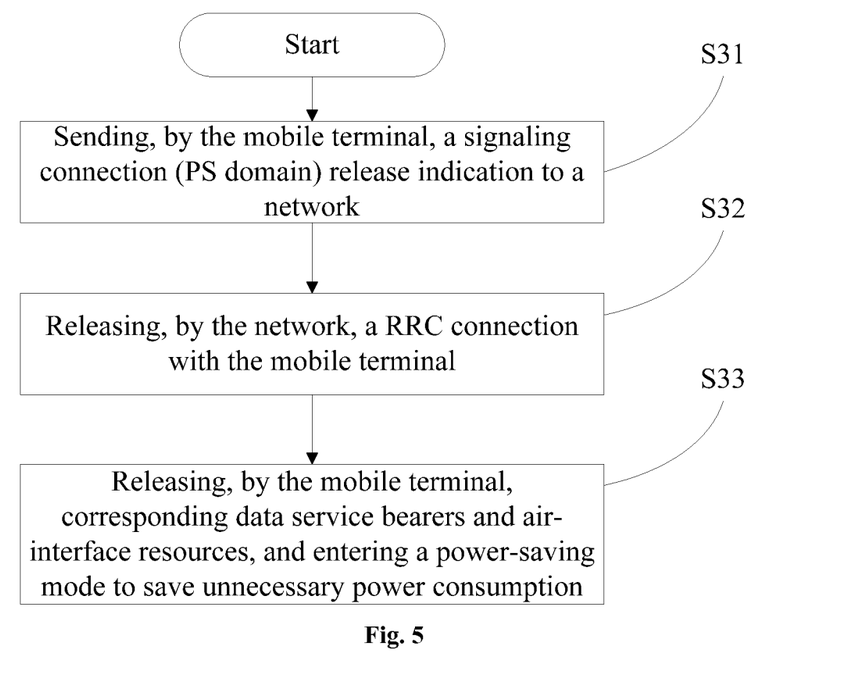
FIG. 5 is a flow chart showing the power-saving operation according to one embodiment of the present invention.

In step S26, if the timer T is timed out, i.e., there is no data transmission for the data service within this period of time, or no conflict with the NAS signaling, the mobile terminal is triggered to execute the power-saving operation. As shown in FIG. 5, it comprises the following steps:

step S31: sending, by the mobile terminal, a signaling connection release indication to an access network;

step S32: releasing, by the access network, the radio resource control (RRC) connection with the mobile terminal; and step S33: releasing, by the mobile terminal, the corresponding data service bearers and air-interface resources, and entering the data service power-saving mode, so as to reduce unnecessary power consumption and save the air-interface resources.

When the mobile terminal enters the data service power-saving mode, merely the air-interface connection between the mobile terminal and the access network is released, and a "virtual connection" still remains between the mobile terminal and the network side, i.e., the information of the mobile terminal, e.g., an IP address, is still stored in the core network, and the PDP context is still in an active state. Once the user restarts the data service, the mobile terminal merely needs to rebuild the air-interface connection with the access network. The wait time is very short, and the user's normal use will not be affected. To be specific, it comprises the following steps:

step S41: re-triggering, by the user, the data service;

step S42: sending, by the mobile terminal, a data service request to the access network;

step S43: configuring, by the access network, the corresponding data service bearers and air-interface resources; and step S44: rebuilding, by the mobile terminal, a radio link and recovering the data service.

Figure 6:
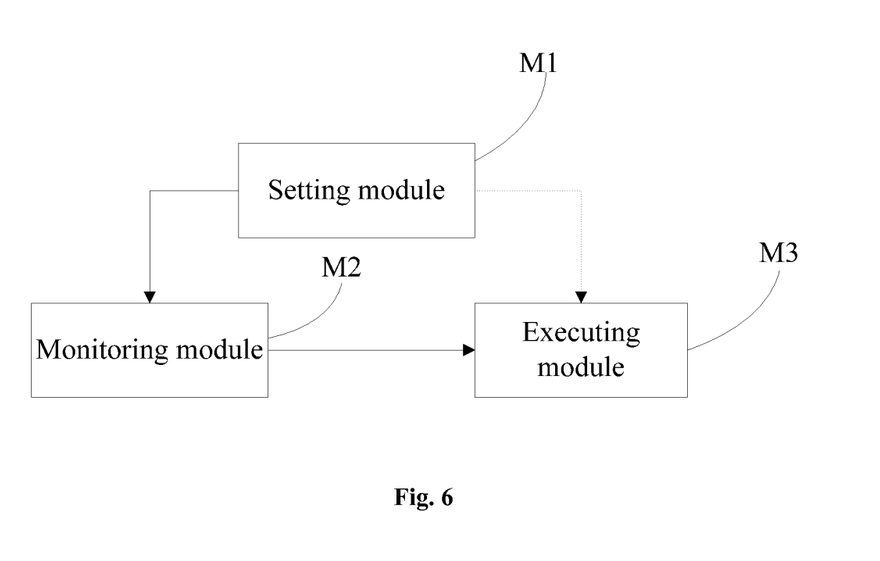
FIG. 6 is a structural schematic view showing a data service power-saving apparatus according to an embodiment of the present invention.

Based on the above-mentioned principles and steps, the present invention further provides a power-saving apparatus for a mobile terminal comprising a setting unit M1, a monitoring unit M2 and an executing unit M3 as shown in FIG. 6.

The setting unit M1 is configured to process user's settings, store a power-saving state (ON or OFF) and parameters thereof, and send a command to the monitoring unit M2 to turn on or turn off the data service power-saving function.

The monitoring unit M2 is configured to start or stop monitoring the data service in accordance with the command from the setting unit M1. If it is desired to monitor the data service, the monitoring unit will monitor the data service in accordance with a corresponding monitoring strategy. Once a data service power-saving strategy is met, the monitoring unit will send a power-saving command to the executing unit M3.

The executing unit M3 is configured to execute the power-saving operation in accordance with the power-saving command from the monitoring unit M2, i.e., send a signaling connection release indication to a network, wait for the network to release a RRC connection, release the corresponding data service bearers and air-interface resources, and enter a power-saving mode for the data service.

Alternatively, the executing unit M3 is connected to the setting unit M1, as shown by the dotted line in FIG. 6, and configured to start or stop receiving the power-saving command from the monitoring unit M2 in accordance with the command from the setting unit M1. When the power-saving operation is stopped, the executing unit M3 may also be in a sleep state and does not need to wait for the power-saving command from the monitoring unit M2. As a result, the power consumption may be reduced in a better manner.

Figure 7:
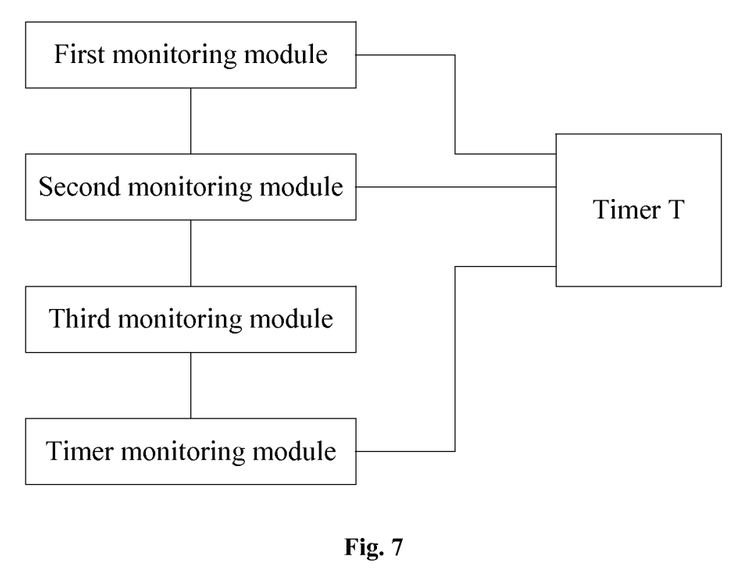
FIG. 7 is a schematic view showing an internal structure of a monitoring module of the data service power-saving apparatus according to an embodiment of the present invention.

FIG. 7 shows the internal structure of the monitoring unit M2, comprising a first monitoring module, a second monitoring module, a third monitoring module, a timer monitoring module, and a timer T connected to the first, second and third monitoring modules and the timer monitoring module respectively.

The first monitoring module is configured to monitor whether there exists an on-going data service on the mobile terminal, and if yes, start the timer T immediately, and send an indication indicating that there exists the data service to the second monitoring module.

The second monitoring module is configured to, after receiving the indication indicating that there exists the data service from the first monitoring module, monitor whether data for the data service is transmitted between the mobile terminal and the network side, if yes, restart the timer T, and if not, send an indication indicating that there exists no data for the data service to the third monitoring module.

The third monitoring module is configured to, after receiving the indication indicating that there exists no data for the data service from the second monitoring module, monitor whether there exists NAS signaling data, if yes, send an indication indicating that there exists the NAS signaling data to the timer monitoring module, and if not, send an indication indicating that there exists no NAS signaling data to the timer monitoring module.

The timer monitoring module is configured to judge whether the timer is timed out upon receiving the indication indicating that there exists no NAS signaling data from the third monitoring module, if yes, send the power-saving command to the executing unit, and if not, continue to monitor the timer; and judge whether the duration away from the timeout of the timer is less than $T_{NAS}$ upon receiving the indication indicating that there exists the NAS signaling data from the third monitoring module, if the duration is less than $T_{NAS}$, adjust the duration away from the timeout of the timer T as $T_{NAS}$, or directly adjust the duration of the timer T as $T+T_{NAS}$, and if the duration is greater than or equal to $T_{NAS}$, continue to monitor the timer.

The timer monitoring module may also be configured to reset the duration of the timer T to a default value or an initial value for the next timing when the timer is timed out and the power-saving command is sent to the executing module.

The timer T receives a command to start the timing from the first monitoring module, a command to restart the timer from the second monitoring module and a command to adjust the duration from the timer monitoring module. After the timer is timed out each time, the timer itself may reset the duration away from the initial one.

In another embodiment, the timer monitoring module is configured to judge whether the duration of the timer T is less than $T_{NAS}$ upon receiving the indication indicating that there exists the NAS signaling data from the third monitoring module, if the duration is less than $T_{NAS}$, directly restart the timer T, and if the duration is greater than or equal to $T_{NAS}$, judge again whether the duration away from the timeout of the timer is less than $T_{NAS}$, if this duration is less than $T_{NAS}$, adjust the duration away from the timeout of the timer T as $T_{NAS}$, or directly adjust the duration of the timer T as $T+T_{NAS}$, and if this duration is greater than or equal to $T_{NAS}$, continue to monitor the timer. Upon receiving the indication indicating that there exists no NAS signaling data from the third monitoring module, the timer monitoring module is configured to judge whether the timer is timed out, if yes, send a power-saving command to the executing unit M3, and if not, continue to monitor the timer.

The above-mentioned power-saving apparatus may be adapted to various mobile terminals with services via a wireless network, such as mobile phone, portable computer and handheld PC.

Through the above-mentioned description, it may be apparent for a person skilled in the art that the present invention may be implemented by hardware, or by software as well as a necessary common hardware platform. Based on this understanding, the technical solution of the present invention may appear in the form of software products, which may be stored in a storage medium and include several instructions so as to turn on a mobile terminal to execute the methods according to the embodiments of the present invention.

The above are merely the embodiments of the present invention. It should be noted that, a person skilled in the art may further make improvements and modifications if without departing from the principle of the present invention, and these improvements and modifications shall also be considered as the scope of the present invention.

What is claimed is:

1. A power-saving method for a mobile terminal, comprising the steps of:
    monitoring, by the mobile terminal, data services in accordance with a monitoring strategy for a data service power-saving state, wherein the monitoring involves
      determining whether or not there exists an on-going data service,
      starting a timer when it is determined that the data service exists,
      monitoring whether or not there exists data transmission for the data service while the timer is running,
      if there exists data transmission for the data service, re-starting the timer and monitoring whether or not there exists the on-going data service, and if there exists no data transmission for the data service, monitoring whether or not there exists non-access stratum NAS signaling transmission,
      if there exists no NAS signaling transmission, judging whether or not the timer is timed out, if not, continuing to monitor the data for the data service, and if yes, regarding that a triggering condition set in the monitoring strategy is met; and
      If there exists NAS signaling, judging whether a duration away from the timeout of the timer is greater than a maximum timer duration $T_{NAS}$ for an NAS layer, if the duration away from the timeout of the timer is greater than $T_{NAS}$, continuing to monitor the data for the data service, and if the duration away from the timeout of the timer is less than $T_{NAS}$, adjusting a duration of the timer so that it is timed out at least after $T_{NAS}$;
    triggering a data service power-saving operation when a triggering condition set in the monitoring strategy is met; and
    performing, by the mobile terminal, the data service power-saving operation.

2. The method according to claim 1, wherein, after the timer is timed out, the duration of the timer is reset to an initial duration, and
    the step of adjusting the duration of the timer comprises:
    prolonging the duration of the timer by $T_{NAS}$; or
    prolonging the duration away from the timeout of the timer to $T_{NAS}$.

3. The method according to claim 1, wherein, prior to the step of judging whether the duration away from the timeout of the timer is greater than $T_{NAS}$, the method further comprises:
    if there exists NAS signaling, prior to judging whether the duration away from the timeout of the timer is greater than $T_{NAS}$, judging whether the duration of the timer is less than $T_{NAS}$; and
    if the duration of the timer is less than $T_{NAS}$, re-starting the timer and monitoring whether or not there exists the on-going data service, and if the duration of the timer is greater than or equal to $T_{NAS}$, judging whether the duration away from the timeout of the timer is greater than $T_{NAS}$.

4. The method according to claim 1, further comprising, prior to monitoring, by the mobile terminal, the data services, a step of setting the mobile terminal to be in the data service power-saving state, wherein
    the step of setting the mobile terminal to be in the data service power-saving state comprises:
    setting the mobile terminal to be in the data service power-saving state by default; or
    setting, by a user, the mobile terminal via software commands, turning on a data service power-saving function, and entering the data service power-saving state.

5. The method according to claim 1, wherein the power-saving operation involves releasing an air-interface connection between the mobile terminal and an access network and maintaining a virtual connection.

6. A mobile terminal, comprising configured to execute software stored on a non-transitory storage medium, which causes the mobile terminal to:
    monitor data services in accordance with a monitoring strategy for a data service power-saving state, wherein the monitoring involves
      determining whether or not there exists an on-going data service,
      starting a timer when it is determined that the data service exists,
      monitoring whether or not there exists data transmission for the data service while the timer is running,
      if there exists data transmission for the data service, re-starting the timer and monitoring whether or not there exists the on-going data service, and if there exists no data transmission for the data service, monitoring whether or not there exists non-access stratum NAS signaling transmission,
      if there exists no NAS signaling transmission, judging whether or not the timer is timed out, if not, continuing to monitor the data for the data service, and if yes, regarding that a triggering condition set in the monitoring strategy is met; and If there exists NAS signaling, judging whether a duration away from the timeout of the timer is greater than a maximum timer duration $T_{NAS}$ for an NAS layer, if the duration away from the timeout of the timer is greater than $T_{NAS}$, continuing to monitor the data for the data service, and if the duration away from the timeout of the timer is less than $T_{NAS}$, adjusting a duration of the timer so that it is timed out at least after $T_{NAS}$;

trigger a data service power-saving operation when a triggering condition set in the monitoring strategy is met; and perform the data service power-saving operation.

7. The mobile terminal method according to claim 6, wherein, after the timer is timed out, the duration of the timer is reset to an initial duration, and the adjustment of the duration of the timer comprises:
prolonging the duration of the timer by $T_{NAS}$; or
prolonging the duration away from the timeout of the timer to $T_{NAS}$.

8. The mobile terminal according to claim 6, wherein, prior to the judging whether the duration away from the timeout of the timer is greater than $T_{NAS}$, the software causes the mobile terminal to:

if there exists NAS signaling, prior to judging whether the duration away from the timeout of the timer is greater than $T_{NAS}$, judge whether the duration of the timer is less than $T_{NAS}$; and if the duration of the timer is less than $T_{NAS}$, re-starting the timer and monitoring whether or not there exists the on-going data service, and if the duration of the timer is greater than or equal to $T_{NAS}$, judge whether the duration away from the timeout of the timer is greater than $T_{NAS}$.

9. The mobile terminal according to claim 6, wherein, prior to monitoring the data services, the mobile terminal is set to be in the data service power-saving state, wherein the setting the mobile terminal to be in the data service power-saving state comprises:

setting the mobile terminal to be in the data service power-saving state by default; or setting, by a user, the mobile terminal via software commands, turning on a data service power-saving function, and entering the data service power-saving state.

10. The mobile terminal according to claim 6, wherein the power-saving operation involves releasing an air-interface connection between the mobile terminal and the network side and maintaining a virtual connection.

11. A power-saving method for a mobile terminal, comprising the steps of:

monitoring, by the mobile terminal, data services in accordance with a monitoring strategy for a data service power-saving state, wherein the monitoring involves determining whether or not there exists an on-going data service, starting a timer when it is determined that the data service exists, monitoring whether or not there exists a data transmission for the data service while the timer is running, and monitoring whether or not there exists a non-access stratum NAS signaling transmission while the timer is running;

triggering a data service power-saving operation when a triggering condition set in the monitoring strategy is met, wherein the triggering condition is that the timer has timed out and that data transmission for the data service and NAS signaling transmissions did not occur between a time when the timer started and when the timer timed out; and performing, by the mobile terminal, the data service power-saving operation.

12. The method according to claim 11, wherein the timer is restarted if there exists a data transmission for the data service or a NAS signaling transmission before the timer is timed out.

13. The method according to claim 12, wherein if there is a NAS signaling transmission before the timer is timed out, the method further comprises:

determining whether a duration remaining on the timer when it is determined there is a NAS signaling transmission is greater than a maximum timer duration for a NAS layer; and adjusting the duration remaining on the timer to be at least equal to the maximum timer duration for the NAS layer when the duration remaining is not greater than the maximum timer duration for the NAS layer.

14. The method according to claim 12, further comprising, prior to monitoring, by the mobile terminal, the data services, a step of setting the mobile terminal to be in the data service power-saving state, wherein the step of setting the mobile terminal to be in the data service power-saving state comprises:

setting the mobile terminal to be in the data service power-saving state by default; or setting, by a user, the mobile terminal via software commands, turning on a data service power-saving function, and entering the data service power-saving state.

15. The method according to claim 12, wherein the power-saving operation involves releasing an air-interface connection between the mobile terminal and an access network and maintaining a virtual connection.

* * * * *